US008789014B2

(12) United States Patent
Robison et al.

(10) Patent No.: US 8,789,014 B2
(45) Date of Patent: Jul. 22, 2014

(54) MANAGING A WORKING SET IN AN INTEGRATED DEVELOPMENT ENVIRONMENT

(75) Inventors: Jeffrey D. Robison, Redmond, WA (US); James Edward Bartlett, Woodinville, WA (US); Monty L. Hammontree, Duvall, WA (US); Steven John Clarke, Edinburgh (GB); Zachary S. Zaiss, Seattle, WA (US); Radames S. Cruz Moreno, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 138 days.

(21) Appl. No.: 13/106,889

(22) Filed: May 13, 2011

(65) Prior Publication Data

US 2012/0291012 A1 Nov. 15, 2012

(51) Int. Cl.
*G06F 9/44* (2006.01)
*G06F 9/45* (2006.01)

(52) U.S. Cl.
USPC ........... 717/120; 717/124; 717/125; 717/127; 717/129; 717/140

(58) Field of Classification Search
None
See application file for complete search history.

(56) References Cited

U.S. PATENT DOCUMENTS 6,393,437 B1 * 5/2002 Zinda et al. .................. 717/124
6,662,357 B1 * 12/2003 Bowman-Amuah .......... 717/120
7,162,488 B2 1/2007 DeVorchik
7,315,826 B1 * 1/2008 Guheen et al. ............... 705/7.29
7,359,990 B2 * 4/2008 Munir et al. .................. 709/246
7,403,901 B1 * 7/2008 Carley et al. ...................... 705/2
7,467,198 B2 * 12/2008 Goodman et al. ............ 709/223
7,496,830 B2 2/2009 Rubin
7,552,429 B2 * 6/2009 Dettinger et al. ............. 717/162
7,716,640 B2 * 5/2010 Pik et al. ....................... 717/124
7,788,273 B2 8/2010 Torres
7,802,234 B2 * 9/2010 Sarukkai et al. .............. 717/127
7,818,677 B2 10/2010 Ruthfield
7,860,817 B2 12/2010 Sweeney
8,253,730 B1 8/2012 Carr
2003/0105620 A1 * 6/2003 Bowen ........................... 703/22
2004/0003091 A1 * 1/2004 Coulthard et al. ............ 709/227
2005/0091254 A1 * 4/2005 Stabb et al. ................... 707/102

(Continued)

OTHER PUBLICATIONS

Vejella, Hima., "Visual Studio 2010 and .NET Framework 4 IDE Enhancements—Part3", Retrieved at <<http://dotnetslackers.com/articles/net/Visual-Studio-2010-and-NET-Framework-4-IDE-Enhancements-Part3.aspx>>, Jan. 8, 2010, pp. 13.

(Continued)

*Primary Examiner* — Isaac Tecklu
*Assistant Examiner* — Hossain Morshed
(74) *Attorney, Agent, or Firm* — Kevin Sullivan; Kate Drakos; Micky Minhas

(57) ABSTRACT

Files supporting a development activity in an IDE are previewed and are not added to a collection of files in a working set for the development activity. A previewed file is represented by a single preview tab displayed on the user interface. The content of a previewed file can be displayed in a preview display portion of a user interface. The preview tab can be stylistically distinct from a durable tab and can identify the current previewed file. A previewed file can be promoted to a durable file. A promoted previewed file is added to the working set for the development activity.

19 Claims, 10 Drawing Sheets

COMPUTER 102
PROCESSOR 142
MEMORY 144
IDE 104
WORKFLOW PROCESS 128
PREVIEW MODULE 106
PREVIEW FILE DISPLAY 110
USER INTERFACE 126
PREVIEWED FILE 108
PREVIEWED FILE HISTORY 120
WORKING SET 112
FULLY OPENED FILE 114
116
USER INPUT 122
100

(56) References Cited

U.S. PATENT DOCUMENTS

| | | | | |
|---|---|---|---|---|
| 2005/0251748 | A1* | 11/2005 | Gusmorino et al. | 715/713 |
| 2006/0074929 | A1* | 4/2006 | Weber et al. | 707/100 |
| 2008/0005235 | A1* | 1/2008 | Hegde et al. | 709/204 |
| 2008/0065596 | A1 | 3/2008 | Shadmon | |
| 2008/0089246 | A1 | 4/2008 | Ghanwani | |
| 2008/0098025 | A1 | 4/2008 | Vadlamani | |
| 2008/0120129 | A1 | 5/2008 | Seubert | |
| 2008/0288886 | A1 | 11/2008 | Sherwood | |
| 2009/0024937 | A1* | 1/2009 | Lauff et al. | 715/762 |
| 2009/0049066 | A1 | 2/2009 | Wu | |
| 2009/0063473 | A1 | 3/2009 | Van Den Berg | |
| 2010/0293546 | A1 | 11/2010 | Liu | |
| 2011/0271257 | A1* | 11/2011 | Terris et al. | 717/125 |
| 2011/0271258 | A1* | 11/2011 | Park et al. | 717/127 |
| 2012/0054226 | A1 | 3/2012 | Cao | |
| 2012/0191759 | A1 | 7/2012 | Best | |
| 2012/0284689 | A1* | 11/2012 | Armstrong et al. | 717/113 |
| 2012/0291012 | A1* | 11/2012 | Robison et al. | 717/120 |
| 2012/0324423 | A1* | 12/2012 | Khan et al. | 717/109 |
| 2013/0007671 | A1* | 1/2013 | Hammontree et al. | 715/853 |

OTHER PUBLICATIONS

Dykstal, David., "What's new in IBM Rational Developer for Power Systems Software Version 7.5", Retrieved at <<http://www.ibm.com/developerworks/rational/library/10/whatsnewinrationaldeveloperforpowersystems7-5/index.html?ca=drs->>, Mar. 18, 2010, pp. 7.

O'Conner, John., "Create Great-Looking GUIs With NetBeans IDE 5.5", Retrieved at <<http://java.sun.com/developer/technicalArticles/tools/nb_guibuilder/>>, Nov. 2006, pp. 6.

Vestdam, Thomas., "Elucidative Programming in Open Integrated Development Environments for Java", Retrieved at <<http://citeseerx.ist.psu.edu/viewdoc/download;jsessionid=1F6D3FD3AE487899058639211A0A8039?doi=10.1.1.8.7401&rep=rep1&type=pdf>>, Proceedings of the 2nd International Conference on the Principles and Practice of Programming in Java—PPPJ, Jun. 16-18, 2003, pp. 6.

"Preview & Navigate Tab Content via Popup in FireFox", Retrieved at <<http://www.tothepc.com/archives/preview-navigate-tab-content-via-popup-in-firefox/>>, Retrieved Date: Mar. 9, 2011, pp. 4.

"Interactive Development Environment (IDE) Enhancements", Retrieved at <<http://msdn.microsoft.com/en-us/library/aa976855(v=vs.71).aspx>>, Retrieved Date: Mar. 9, 2011, pp. 5.

"Change how the Reading Pane looks and works", Retrieved at <<http://office.microsoft.com/en-us/outlook-help/change-how-the-reading-pane-looks-and-works-HP005242695.aspx>>, May 7, 2011, p. 1.

U.S. Appl. No. 13/171,496, Non-Final Rejection dated Feb. 26, 2013, 21 pages.

U.S. Appl. No. 13/171,496, Amendment filed May 24, 2013, 16 pages.

John Robbins' Blog, "How Does VS2010 Historical Debugging Work?", http://www.wintelect.com/cs/blogs/jrobbins/archive/2009/06/16/how-does-vs2010-historical-debugging-work.aspx as of Jun. 16, 2009, 14 pages.

"Professional Visual Studio 2010" by Nick Randolph, Publisher: Wrox, May 3, 2010, 9 pages.

Collier, Adrian., "The Visual Studio Blog", Retrieved at <<http://blogs.msdn.com/b/visualstudio/archive/2010/07/20/solution-navigator-blog-post.aspx?PageIndex=2>>, dated Jul. 20, 2010, Retrieved Date: Jun. 7, 2011, pp. 21.

Dakka, et al., "Automatic Construction of Multifaceted Browsing Interfaces", Retrieved at <<http://citeseerx.ist.psu.edu/viewdoc/download?doi=10.1.1.85.325&rep=rep1&type=pdf>>, Proceedings of the 14th ACM international conference on Information and knowledge management, Oct. 31-Nov. 5, 2005, pp. 768-775.

"Navigating and Searching (Visual C#)", Retrieved at <<http://msdn.microsoft.com/en-us/library/ms173082%28VS.90%29.aspx, Retrieved Date: Jun. 7, 2011, pp. 3.

U.S. Appl. No. 13/171,496, Final Rejection dated Oct. 25, 2013, 23 pages.

U.S. Appl. No. 13/171,496, Amendment After Final Rejection dated Jan. 27, 2014, 16 pages.

Randolph, Nick, "Professional Visual Studio ® 2010", May 3, 2010, pp. 63-65.

* cited by examiner

MANAGING A WORKING SET IN AN INTEGRATED DEVELOPMENT ENVIRONMENT

BACKGROUND

Understanding and debugging program code often involves browsing, searching, and stepping through a number of program code files. For example, a user may browse search results or explore definition graphs. Typically, when a file is opened in an Integrated Development Environment (IDE), the IDE adds the file as a tab to the collection of tabs displayed on a display screen. This approach assumes that most of the files that are open will be found useful by the user. However, users can find that so many files have been opened that it becomes difficult to keep track of what files are open and what is of interest in the open files. This can be especially true for a user who is working with unfamiliar code.

SUMMARY

When developing and debugging program code in an IDE, the set of files in a user's working set are files that have been fully opened. These files are called durable files. The set of durable files in a user's working set can be represented by a collection of corresponding durable tabs displayed on a user's display screen. One or more durable tabs can be displayed on the screen, one for each file in the user's working set. When a durable tab is selected, the content of the durable file is displayed in a window or pane on a user interface that can be displayed on a display screen.

Files supporting a development activity in an IDE are opened provisionally instead of fully. A file that is opened provisionally is called a previewed file and is transient. Previewed files are not automatically added to the set of files comprising the user's working set. That is, a previewed file is not added to the working set programmatically, triggered by or in response to the file being opened provisionally, without any explicit user action or intervention that causes the file to be added to the working set. Previewed files are not represented in the collection of durable tabs displayed on a user interface. Instead, a previewed file is represented by a single preview tab per well displayed on the user interface. The content of a previewed file can be displayed in a preview display portion of a user interface. The content of a previewed file can be displayed by selecting the single reusable preview tab on the display screen. The previewed file can be displayed automatically in response to specific user actions performed within a workflow. The preview tab can be stylistically distinct (can differ from a stylistic perspective) from a durable tab and can identify the current previewed file.

One or more mechanisms can be provided to enable promotion of a previewed file to a durable file. A promoted previewed file is transformed to become a fully open file and the promoted previewed file is automatically added to the files comprising the working set for the development activity. A previewed file that is promoted to become a member of the user's working set is displayed instead by selecting a new tab in the collection of durable tabs and is displayed in a durable file display.

Selecting a preview tab can display the content of a file that a user has chosen to open provisionally instead of to open fully. When the user chooses to view another previewed file, a new preview tab is not created within the document well. Instead the identifier of the single preview tab is refreshed with the identifier of the new previewed file. Similarly, the content of the preview display can be refreshed with the content of the new previewed file. Selecting the provisional tab can result in display of the content of the new previewed file. Reusing a single preview tab for previewed files can manage a working set, and can reduce the number of tabs that appear on the display screen. A historical record of previewed files can be maintained. A file can be previewed by actions such as stepping through code in the debugger, or by performing particular user gestures in tool windows and/or content handlers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings:

FIGS. 2*b*, 2*c*, 2*d*, 2*e*, 2*f* and 2*g* are illustrations of examples of user interfaces in accordance with aspects of the subject matter disclosed herein;

DETAILED DESCRIPTION

Overview

Figure 1:
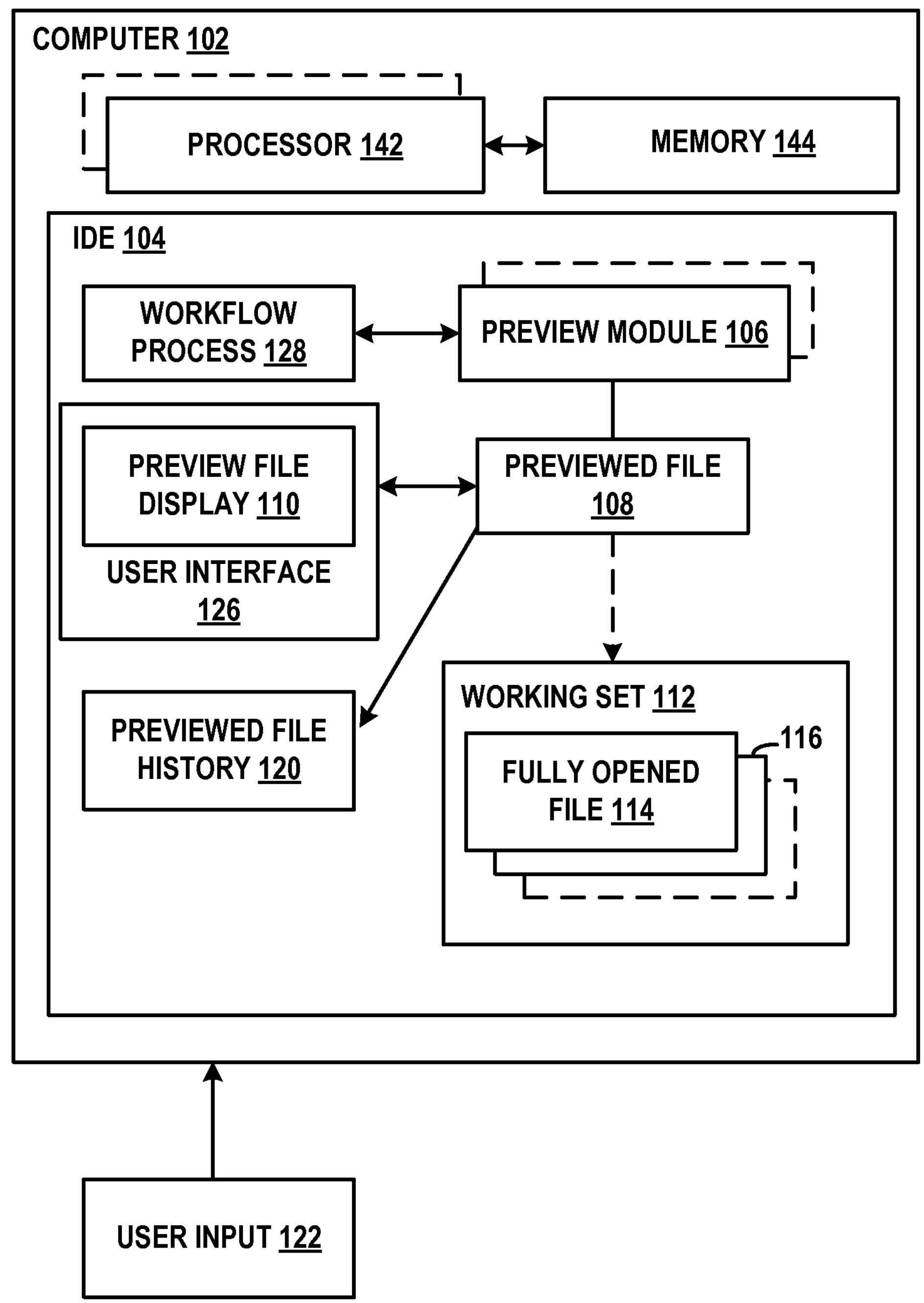
FIG. 1 illustrates an example of a system 100 that can manage a user's working set of files for a development activity in an IDE in accordance with aspects of the subject matter disclosed herein.

Suppose a user such as a developer is exploring a sample application with the intent of using it as the starting point for a new application he has been asked to develop. Suppose the sample application includes several projects and many code files. The user may spend a few minutes locating a useful application entry point using a "find" search feature and then may browse through the source code and definitions using a "go to definition" feature. Typically, in known IDEs, selecting a search result or using a "find" feature opens the file and includes it in the user's working set. The user either has to spend time closing files and rearranging remaining files in his working set or he has to spend more time searching in a working set that includes a number of files that may not be helpful. In accordance with aspects of the subject matter disclosed herein, selecting a search result or using a "find" feature results in a file being previewed instead of fully opening the file. This approach allows the user to browse a code file and then decide if the file is likely to be useful for his project. The previewed file is not added to the working set until an explicit user action is performed, giving the user more control over his working set.

Now suppose a user such as a developer is trying to fix bugs in an unfamiliar application. After reproducing the bugs, the user may begin to explore the program code, setting breakpoints and stepping through the code. Suppose that although the application is large, the user has deduced that only a handful of code files are likely to be involved in fixing the bugs. In accordance with aspects of the subject matter disclosed herein, any file that the user steps into with the debugger is previewed, allowing the user to browse program code without adding to the collection of files already determined to be relevant to fixing the bugs. When the user spots relevant lines of code in a previewed file, the file including those lines of code can be added to his working set by an explicit user action, reducing the work involved in managing the working set.

In accordance with aspects of the subject matter disclosed herein, a previewed file can be transformed into a durable file by an explicit user action. The transformed file can be integrated seamlessly into the user's current workflow. The action or gesture that triggers the transformation of the document from the previewed state to the durable state can be clearly distinguished from an action or gesture used to open a document fully. Distinct user interface (UI) prompts are provided for the user to trigger the transformation. In accordance with some aspects of the subject matter described herein, previewed file content is stylistically distinguishable from durable file content. That is, content from a previewed file differs in stylistic appearance from content from a fully opened (durable) file. Previewed files can be viewed by selecting a preview tab in a user interface. The preview tab can be separated spatially from the collection of durable tabs in the user interface. The appearance of the preview tab can be stylistically distinguishable from the appearance of a durable tab. The chronological order in which previewed files have been viewed by the user can be maintained and retrieved. The history of previewed files can be kept separate or can be integrated with the history of fully opened files. The feature enabling previewing of files can be integrated with existing workflows. The feature can be turned on or off by a user.

One workflow in which previewing files can be integrated is debugging code. During a debug session, when code is stepped into, the file that is stepped into can be previewed. The file can be viewed in the preview display. The previewed file is not added to the user's working set. Because previewing a stepped-into file does not automatically add the file to the user's working set, the number of files that appear in the user interface as a result of stepping through code can be reduced. Similarly, a file can be previewed when the user performs a command that goes to a definition of a method, function, or variable in the file. For example, in response to receiving a "go to definition" command, the file containing the definition can be previewed in the preview display but is not automatically added to the working set of files. The identifier of the file does not appear in the collection of durable tabs on the display screen. Instead the identifier of the file can appear in a single reusable preview tab that is stylistically distinguishable from the durable tabs in the user interface. The user can promote the previewed file to a fully opened file by performing particular user gestures such as selecting a promote button or by performing particular user actions in programming tools and content handlers such as editing the file.

Managing a Working Set in an IDE

FIG. 1 illustrates an example of a system 100 for managing a user's working set of files for a development activity in an IDE in accordance with aspects of the subject matter disclosed herein. All or portions of system 100 may reside on one or more computers such as the computers described below with respect to FIG. 3. System 100 may execute on a software development computer such as the software development computer described with respect to FIG. 4. System 100 may execute within an IDE such as IDE 104. IDE 104 can be an IDE such as the one described with respect to FIG. 4 or can be any other IDE. All or portions of system 100 may be implemented as a plug-in or add-on.

System 100 may include one or more computers or computing device such as a computer 102 comprising: one or more processors such as processor 142, etc., a memory such as memory 144, and one or more modules for detecting a preview trigger, previewing a file, viewing the previewed file and optionally promoting the previewed file to a durable file in an IDE. In FIG. 1 this module or modules is represented by preview module 106, etc., as described herein. Other components well known in the arts may also be included but are not here shown. It will be appreciated that one or more modules such as preview module 106, etc. can be loaded into memory 144 to cause one or more processors such as processor 142 to perform the actions attributed to the one or more modules.

Preview module 106, etc. may include one or more modules that detect one of a plurality of actions that trigger previewing a file, the actions occurring in a workflow process 128. Previewing a file can be triggered by receiving user input 122 and/or by receiving input received from a tool or other program executing in the workflow process 128, as described more fully below. Alternatively, preview module 106, etc. may receive a notification from workflow process 128, indicating that a request to preview an indicated file has been received. In response, preview module 106, etc., can preview the indicated file (e.g., previewed file 108) and place the content of the previewed file 108 in a preview file display 110 of a user interface 126. Preview module 106, etc. can place a file identifier of the previewed file 108 in a preview tab of the user interface 126 and display the content of the previewed file in the preview file display 110 of the user interface 126. Preview file display 110 can include both an area for content of the previewed file and the preview tab that identifies the file which is the source of the content.

The preview file display 110 can be stylistically distinct from the visual representation of a fully opened document. The preview tab that identifies the previewed file can be separated from the collection of durable tabs in the user interface 126. If the preview tab already houses an identifier of a previously previewed file, the existing identifier can be removed and/or replaced with the current previewed file identifier. Similarly, if the preview file display 110 already houses content associated with a previous previewed file, the content can be removed and/or replaced with the content associated with the current previewed file, thus reusing both the preview tab and the preview file display 110 in the user interface 126. That is, both the preview display and the preview tab are reusable. In contrast, durable tabs are non-reusable. Only one preview tab and only one preview display may be available per well in the user interface. A document well (e.g., document well 231 of FIG. 2*c*) is a window or pane of a user interface and can display a document. A user interface can display one or more document wells. A tool well (e.g., tool well 223 or tool well 226 of FIG. 2*c*) is a window or pane that can display the output of a tool. Preview module 106, etc. can record the name of each previewed file in a previewed file history 120. By viewing the previewed file history, the chronological order in which previewed files have been viewed by the user can be displayed. In accordance with some aspects of the subject matter disclosed herein, the history for previewed files can be viewed separately from the history of fully opened files. Alternatively, the history for previewed files can be merged with the history of fully opened files. Previewed files may be stylistically distinguishable from fully opened files in a merged history file. For example, previewed files may be displayed in italics or underlined or can appear in a different font or font color or background color or the like.

As described above, a previewed file is not automatically added to the working set 112 in response to being previewed, as is the case with fully opened files. The working set 112 is comprised of all the files that were fully opened during the development activity (e.g., file 114, 116, etc.). Files are only removed from the working set by an explicit action taken by a user closing the fully opened file. However, the transient previewed file can be promoted to a durable fully opened file and can be added to the working set 112 in response to the promotion of the previewed file. In accordance with some aspects of the subject matter disclosed herein, when a previewed file is promoted, the content of the preview file display 110 may be replaced with the content of the previous previewed file. Similarly, the identifier of the preview tab may be replaced with the corresponding identifier. The preview module 106, etc. can receive further input from a user indicating that a previewed file is to be promoted to a durable file. For example, a promote button can be presented on the user interface 126 (e.g., on the preview tab, above the preview tab, etc.). In response to a user action clicking on the promote button, or otherwise selecting the promote command, the previewed file 108 can be transformed to a durable file. The preview module 106, etc. can receive further input from a program executing in the workflow process 128 such as but not limited to a programming tool or content tool, indicating that a previewed file is to be promoted to a durable file. In response, the preview module 106, etc. can promote the previewed file 108 to a durable file and add the promoted previewed file to the working set 112. Promotion of the previewed file 108 to a durable file transforms the previewed file 108 to a durable or fully opened file, adds it to the working set 112, removes the previewed file identifier from the preview tab, removes the previewed file content from the preview file display 110, removes the preview tab, and adds the identifier of the promoted previewed file to the collection of durable tabs displayed in the user interface 126.

The preview module 106, etc. may remove the promoted previewed file from the previewed file history 120 and may add the promoted previewed file to the durable file history. If the previewed file history is merged with the durable file history, the preview module 106, etc. can change the appearance of the file identifier to the appearance of a durable file identifier.

By previewing files only one preview tab is used per document well, reducing the total number of tabs displayed in the user interface 126 and reducing the total number of files in a user's working set. Previewed files can include files such as but not limited to code files, text files, design files, work items, and any other file type supported by the IDE 104.

User actions triggering previewing a file can be distinct from user actions triggering fully opening a file. For example, FIG. **2*b* is an illustration of an example of a user interface 220 that shows an identifier 222 of a fully opened file PaintCanvas.cs in a durable tab 224. User interface 220 also shows a tool well 226 that displays results of a "find" operation. In FIG. 2*b* a user has clicked on the file C:\Paint\PaintCanvasCommands.cs, as indicated by the text box 228 ("user clicks on a find result"). It will be appreciated that text box 228 does not appear on user interface 220, but is meant to clarify the figure. In response to a user single-clicking on a member of the find results, the selected file can be previewed and displayed in a preview display of a user interface. FIG. 2*c* is an example of such a user interface 230. In response to a user selecting a previewed file e.g., C:\Paint\PaintCanvasCommands.cs 227, a preview of the file can be displayed, as indicated by text box 238 of FIG. 2*c* ("Preview opens. Tab is in distinct position and has distinct styling."). It will be appreciated that text box 228 does not appear on user interface 220**, but is meant to clarify the figure.

The identifier of the previewed file (e.g., identifier 232 of the previewed file PaintCanvasCommands.cs) can be displayed in a single preview tab such as preview tab 234. The appearance of the preview tab can be stylistically distinct from the appearance of the durable tab. For example, the preview tab (e.g., preview tab 234) can be a different color than a durable tab (e.g. durable tab 224). The preview tab can be spatially separated from the durable tabs (e.g., the preview tab 234 is on the right side of the display while durable tabs such as durable tab 224 is on the left side of the display) and so on. Similarly, the previewed file identifier can be displayed in a different font than the durable tab is displayed in, and so on. The contents of the previewed file (e.g. the contents of PaintCanvasCommands.cs) can be displayed in the preview display 236. The appearance of the content of a previewed file such as the content of PaintCanvasCommand.cs can be stylistically distinct from the appearance of the content of a fully opened file such as content 225 of FIG. **2*b*. For example, the background of the preview display 236** can be a different color, the font used to display the content of the previewed file can be different and so on.

It will be appreciated that although one example of a tool window is displayed, any tool window, editor, or designer supporting the feature or features described herein are contemplated. For example, a distinct user action such as but not limited to single clicking on the name of a file in a list of files in a navigator or other tool window can also comprise a user action that triggers previewing a file. It will be appreciated that, in the example, single clicking on a file name can contrast to double clicking on the name of the file in the tool, where double clicking on the file name fully opens the file and adds the file to the working set. The preview module 106, etc. can map a command to preview a file to a gesture including but not limited to the single click gesture. The file does not have to be selected in a separate action before the preview gesture is made. Alternatively, options can be provided in the user interface for previewing a selected file. For example, a preview button can be provided on a menu bar or right clicking on a button may generate a list in which an option is previewing a selected file.

Previewing a file may occur as a result of a particular user action or series of actions within a workflow. For example, FIG. **2*d* illustrates an example of a user interface 240 in which a context menu 242 is displayed in response to right-clicking on the object PaintObject 246. In response to a user selecting a "go to definition" option 244 in the context menu 242, the user interface 250 of FIG. 2*e* can be displayed. In user interface 250, the file that includes the definition of PaintObject.cs is previewed and placed in the preview display so that the place in the file where the requested definition (PaintObject 252**) is found can be viewed.

In known IDEs, a debugging session can cause additional documents to open automatically, without explicit user direction. That is, in known IDEs, in response to stepping into a file being debugged, the stepped-into file is opened fully, the file identifier of the stepped-into file is placed in a durable tab in the collection of durable tabs in the user interface and the stepped-into file is added to the working set. In contrast, in accordance with aspects of the subject matter disclosed herein, instead of fully opening each file that the user steps into in a debug session, the file stepped into is previewed and the identifier of the previewed file is placed in the single reusable preview tab of the well. The content of the previewed file may be displayed automatically in a previewed file display. The previewed file is not added to the working set. However, the previewed file can be promoted to a durable file. Thus at the end of a debug session the only files added to the working set are files that were either explicitly promoted to durable files or were promoted because of well-defined actions taken by the user in the workflow.

Figure 2A:
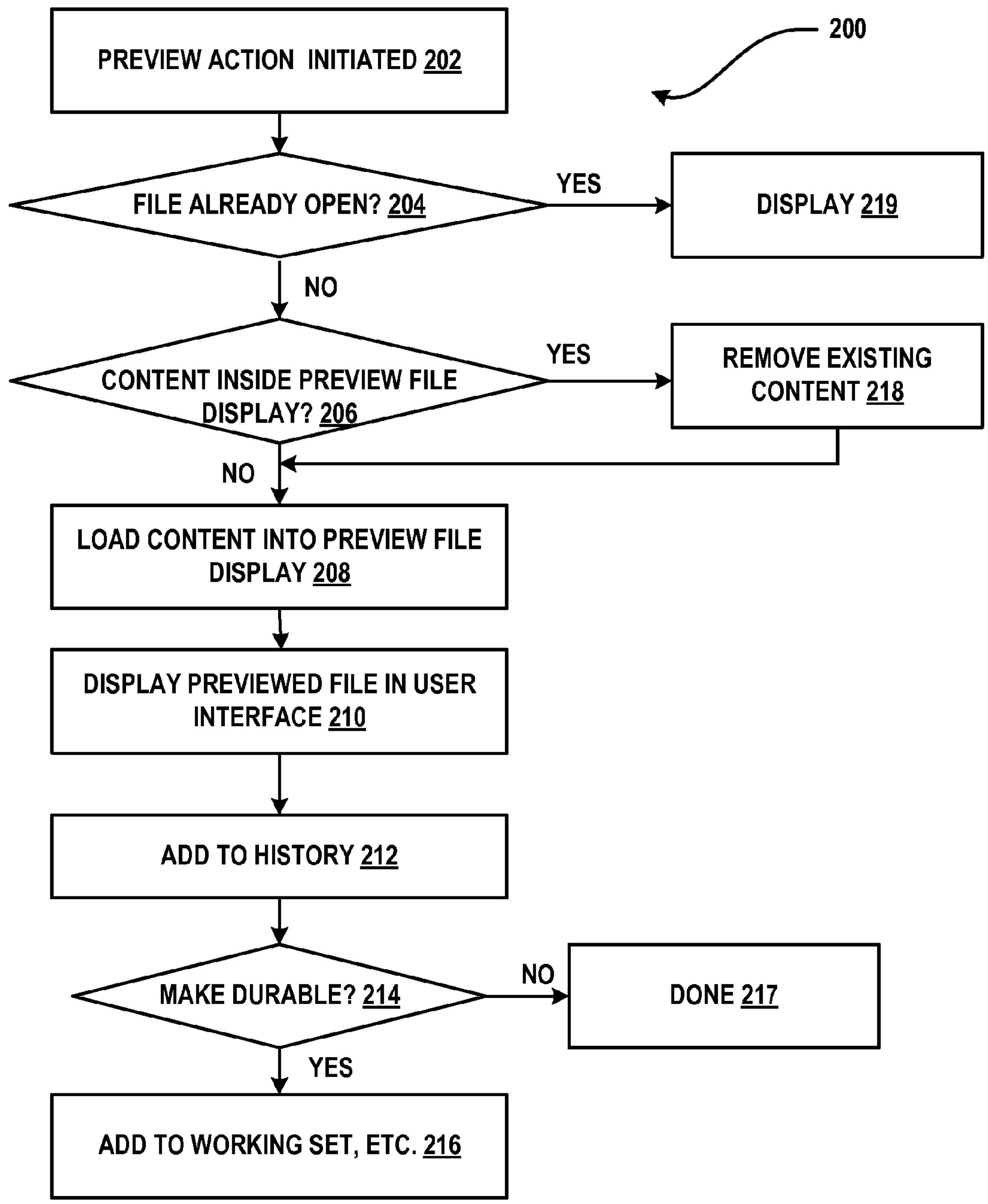
FIG. 2*a* is an illustration of a method for managing a working set in accordance with aspects of the subject matter disclosed herein.
Figure 2B:
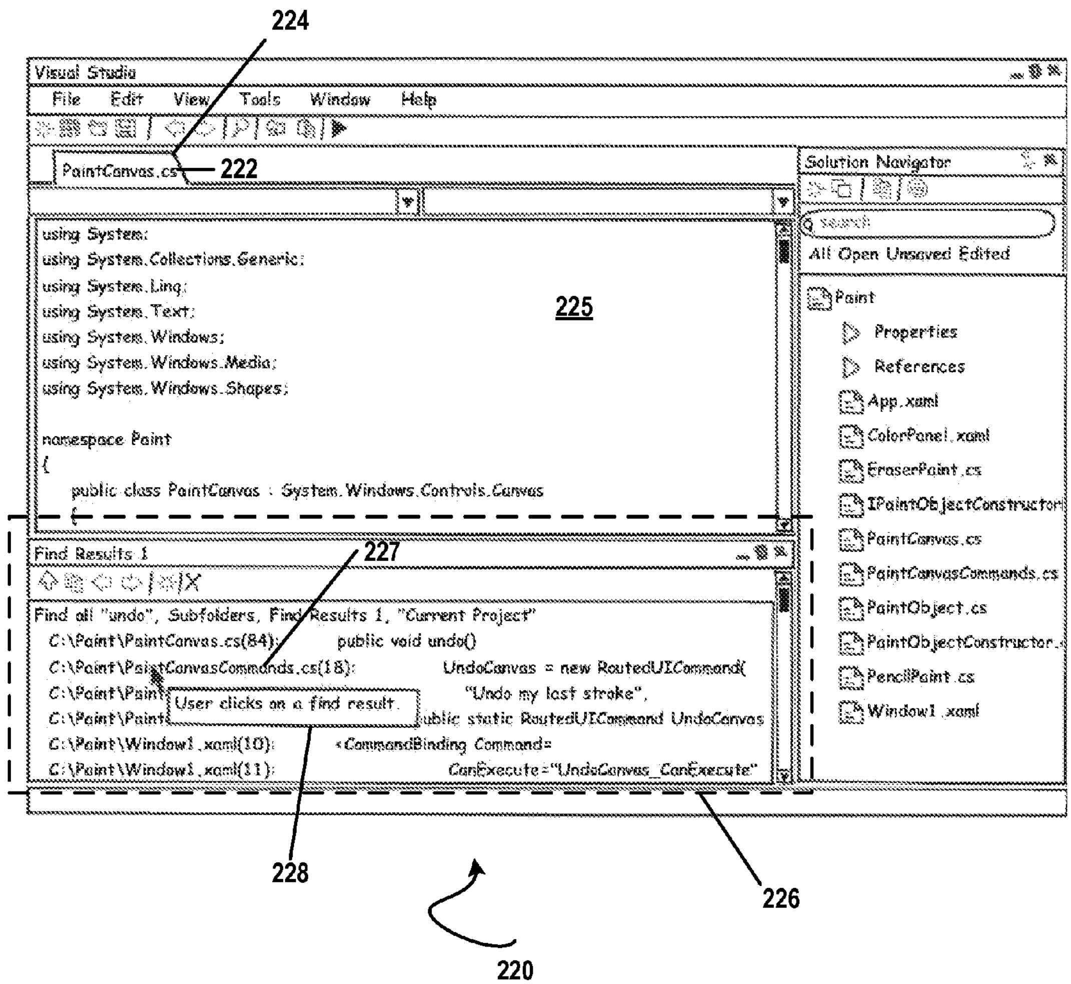
Figure 2C:
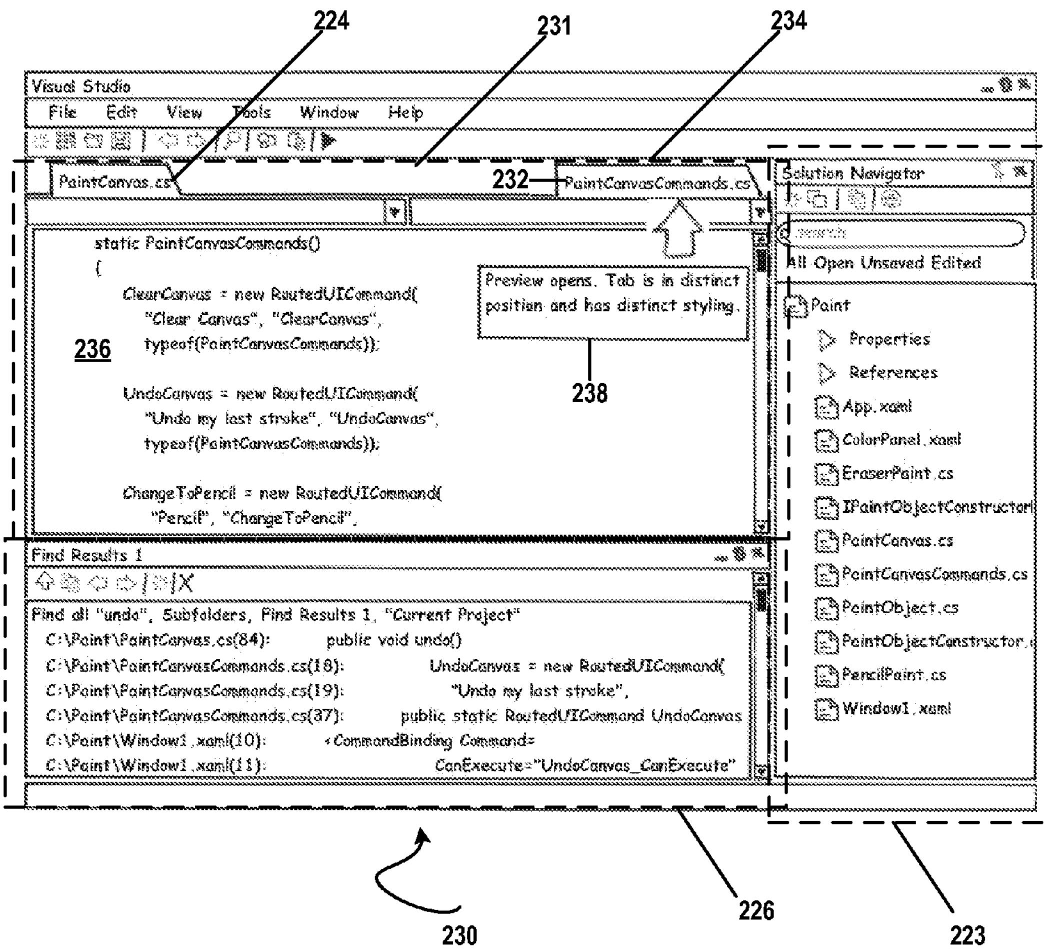
Figure 2D:
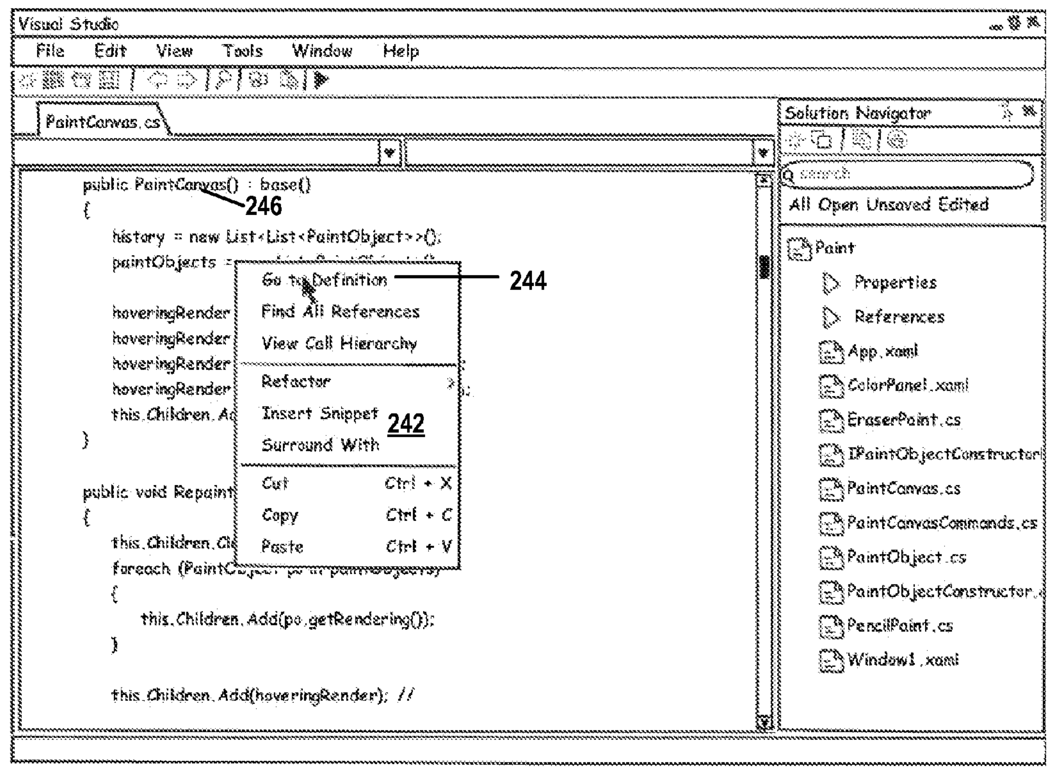
Figure 2E:
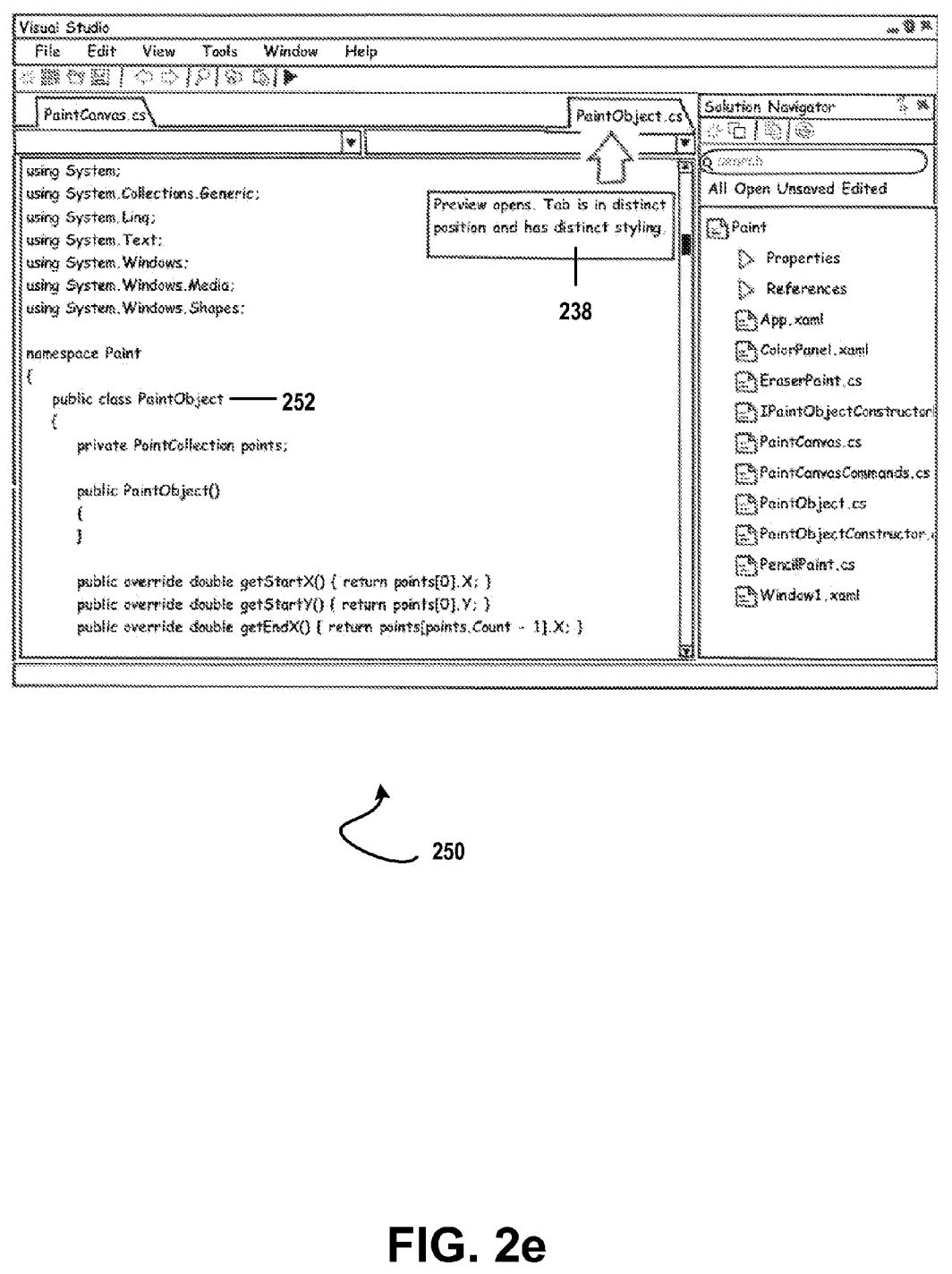
Figure 2F:
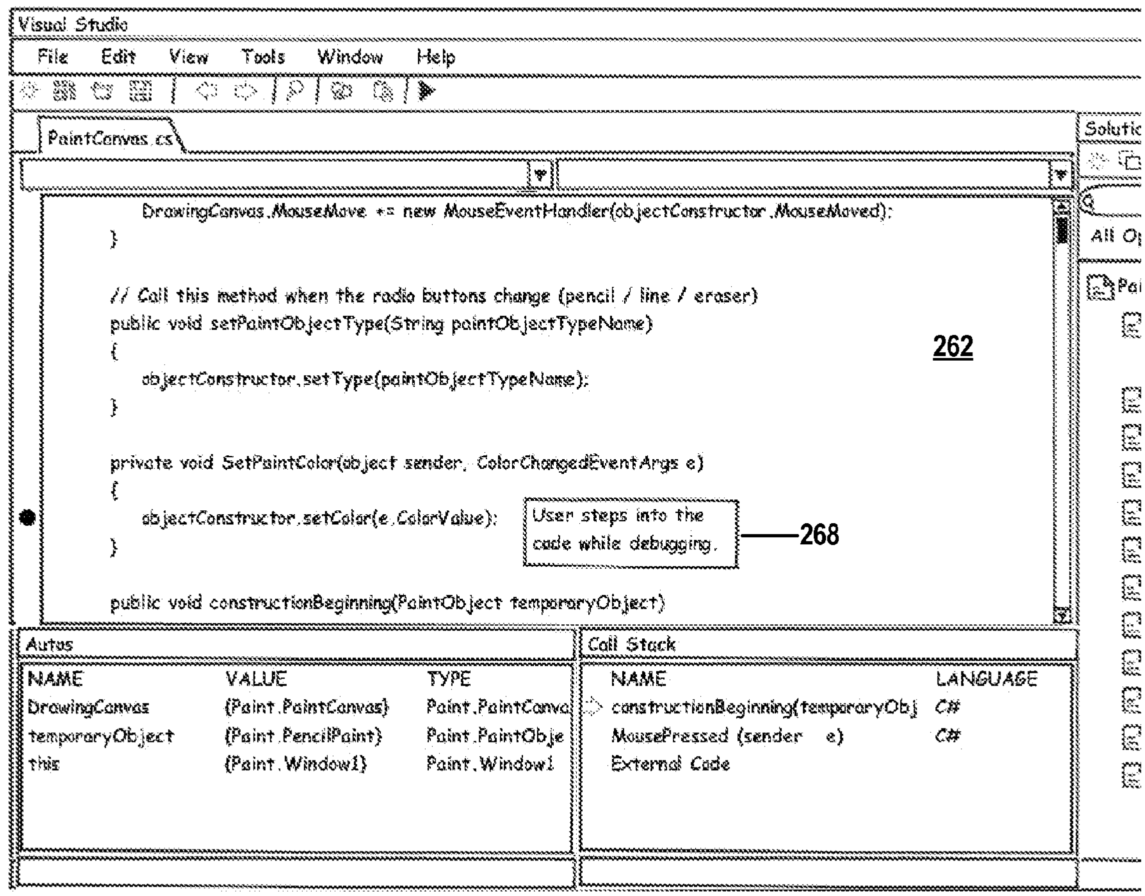
Figure 2G:
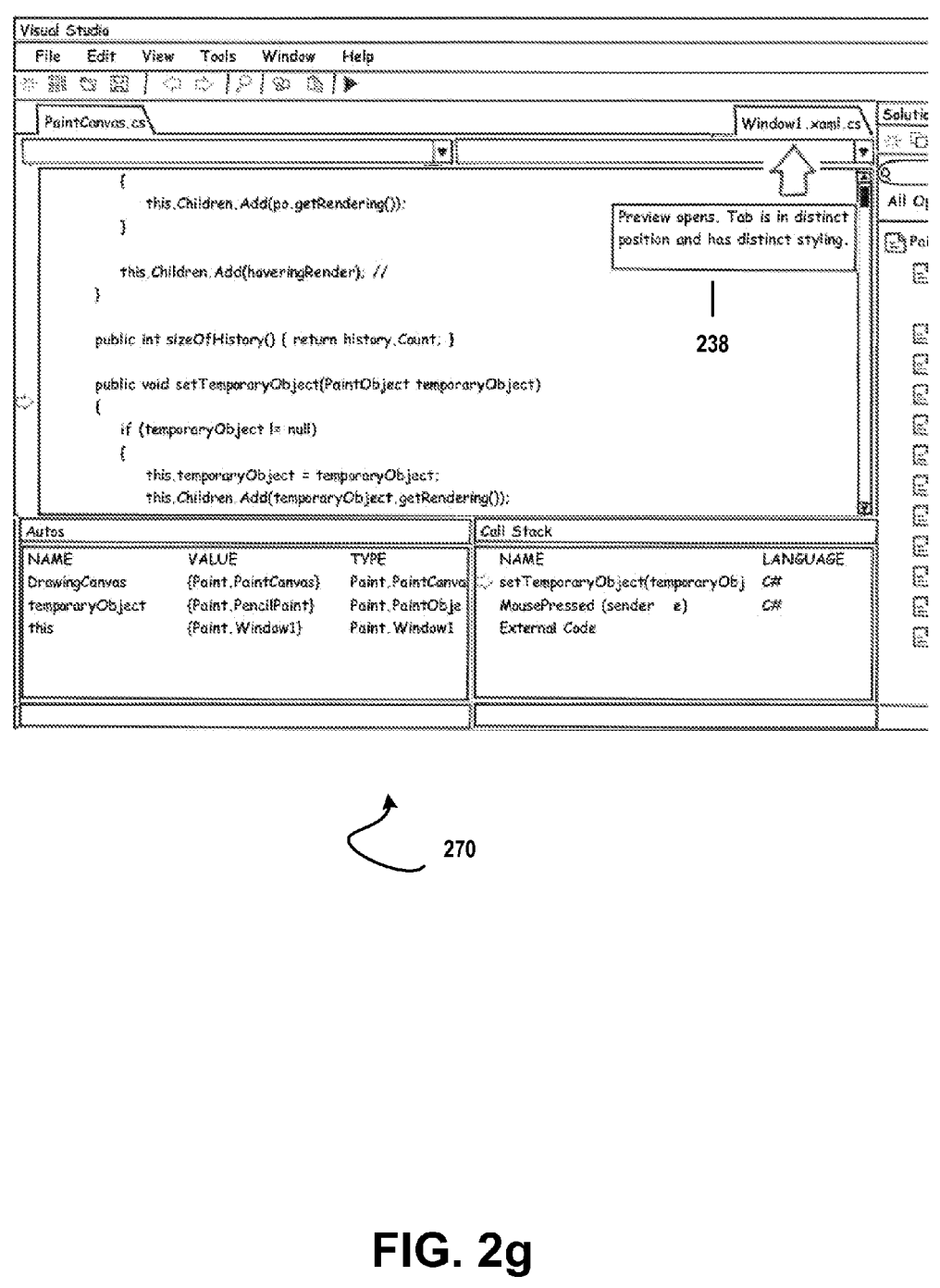

FIG. 2*f* illustrates an example of a user interface 260 where a user is debugging a file PaintCanvas.cs. PaintCanvas.cs is a fully opened file. The user has placed a breakpoint at the line indicated by the circle 264 in content 262. When the debugger suspends execution of the program at the breakpoint, the user can step into the method setColor (see text box 268. It will be appreciated that text box 268 is appears in FIG. 2*g* for ease of understanding the Figure and is not actually displayed in the user interface.) This method is defined in a file, Window1.xaml.cs, that has not been opened. In response, the file Window1.xaml.cs is previewed as illustrated by FIG. 2*g* user interface 270.

User actions performed in the workflow that automatically promote a previewed file to a durable file include editing a previewed file in a source code editor, designer or class diagram. Editing a previewed file, automatically, without explicit user intervention, promotes the previewed file to a durable file. An action attempting to drag the preview tab, automatically, without explicit user intervention, promotes the previewed file to a durable file. Executing a float command on the content of a previewed document automatically, without explicit user intervention, promotes the previewed file to a durable file. A float command removes the tab and document viewing pane from the document well and places it on top of the IDE in its own window.

Another way that a previewed file can be transformed into a durable file is by selecting a promote option. For example, when a user clicks a promote button or selects a promote command, a new durable tab can be created. The new durable tab can include the same content that the user was previewing and can be scrolled to the same view state. The preview tab can be refreshed to show the identifier of the file that was previewed prior to the one just promoted. If a file in preview mode is edited, the file can automatically be promoted to a durable file, placed in a durable tab and added to the working set. Automatically promoting an edited previewed file in this way means that the user does not have to explicitly promote the file before he begins editing. If a user tries to drag content of a preview display elsewhere on the user interface, the previewed file can be promoted automatically to a durable file. A durable file can be placed elsewhere in the environment using a drag operation.

Finally, a list of previewed files viewed by a user can be provided to the user. The list gives the user an opportunity to go back to a document that was previewed earlier but was not promoted to a durable file. A chronological ordering of previewed documents can be available using a navigation feature that allows a user to navigate backwards and forwards.

FIG. 2*a* illustrates an example of a method 200 that can be used to view previewed files, and to manage a user's working set in accordance with aspects of the subject matter disclosed herein. The method described in FIG. 2*a* can be practiced by a system such as but not limited to the one described with respect to FIG. 1. Some of the actions described below can be optional. Some of the actions described below can be executed in a sequence that differs from that described below.

At 202 previewing a file can be initiated in various ways, as described above. Previewing a file can be triggered by detection of a user action performing a particular action or gesture that is distinguishable from a file open action or gesture. For example, single clicking on a file displayed in a tool window can be a trigger to preview the selected file. Previewing a file can be triggered by editing content (e.g., in an editor, designer, class diagram, etc.). Previewing a file can be triggered by executing a "go to definition" command, wherein the file including the definition is automatically previewed. Previewing a file can be triggered by a debug operation in which a user steps into a debug file and so on. At 204, in response to determining that the file is already fully open, the durable file is displayed in a durable file display at 219. In response to determining that the file is not already fully open, processing continues at 206. Alternatively, in accordance with some aspects of the subject matter disclosed herein, even though a file selected for preview is already in the user's working set, instead of displaying the durable file in a durable file display, the file selected for preview is displayed in a preview display, and can be scrolled to the same view state.

At 206 if it is determined that the previewed file display already contains content, the existing content is removed at 218. At 206 if it is determined that the previewed file display does not already contain content, the previewed file content is loaded into the previewed file display at 208. At 210, the previewed file display is displayed on the user interface. At 212 the previewed file identifier is added to the list of previously previewed documents in the previewed file history. As described above the previewed file history can be separate from or merged with the durable file history. At 214 if a user action that explicitly or automatically promotes the previewed file to a durable file is not detected, the process ends at 217. At 214, if a user action that explicitly or automatically promotes the previewed file to a durable file is detected, at 216 the previewed file is transformed into a durable file, the promoted previewed file is added to the working set, the promoted previewed file identifier is removed from the provision tab, a new durable tab is created and labeled with the promoted previewed file identifier, the promoted previewed file is removed from the previewed file history, the promoted previewed file is added to the durable file history or if the histories are merged, the appearance of the promoted previewed file identifier can be changed to the appearance of the durable file identifiers. It will be appreciated that the subject matter described although described in the context of an IDE is equally applicable to any area in which complex relationships exist among files, including but not limited to three dimensional modeling and computer aided design/drafting applications.

Example of a Suitable Computing Environment

Figure 3:
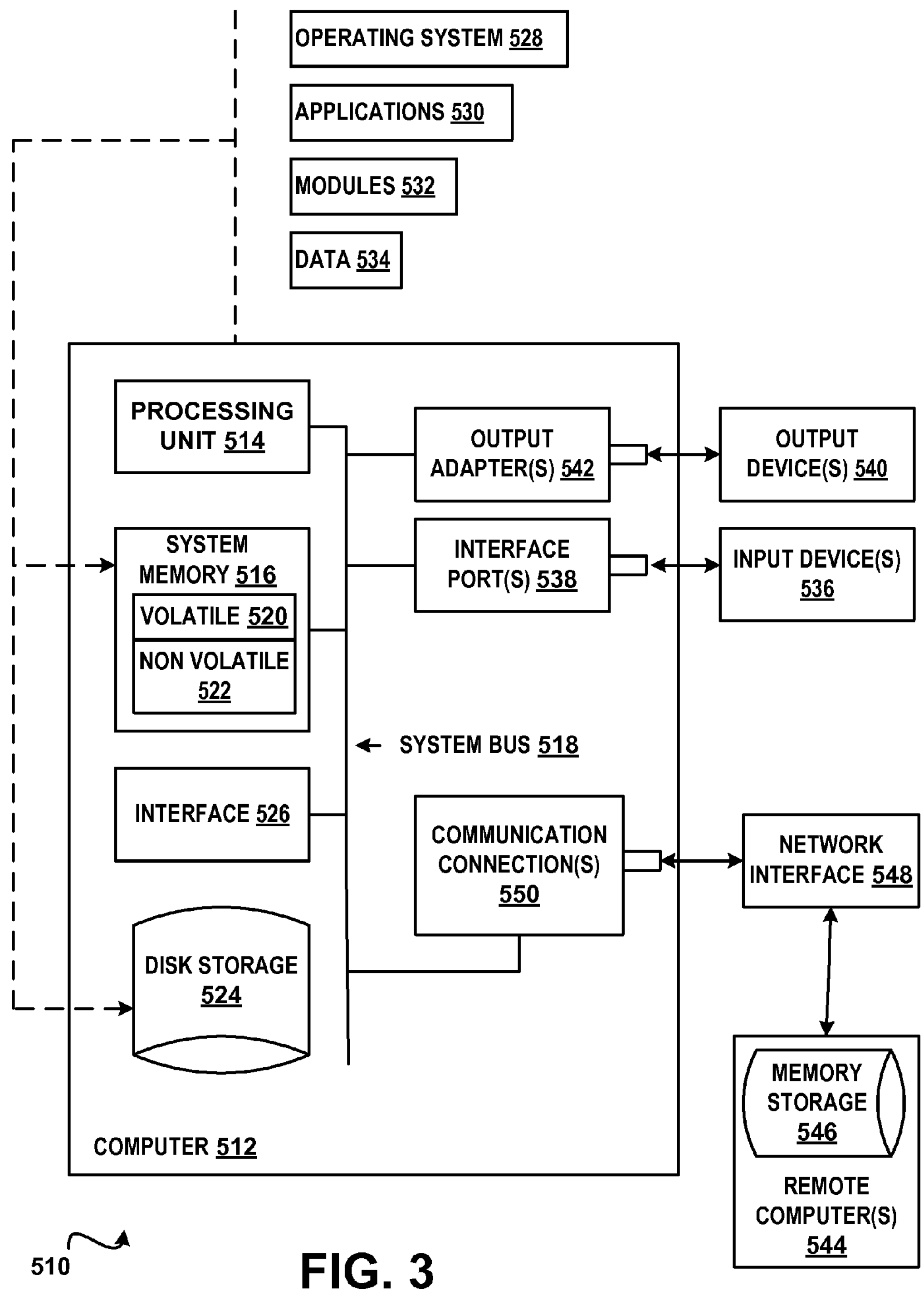
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include a processing unit 514, a system memory 516, and a system bus

518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
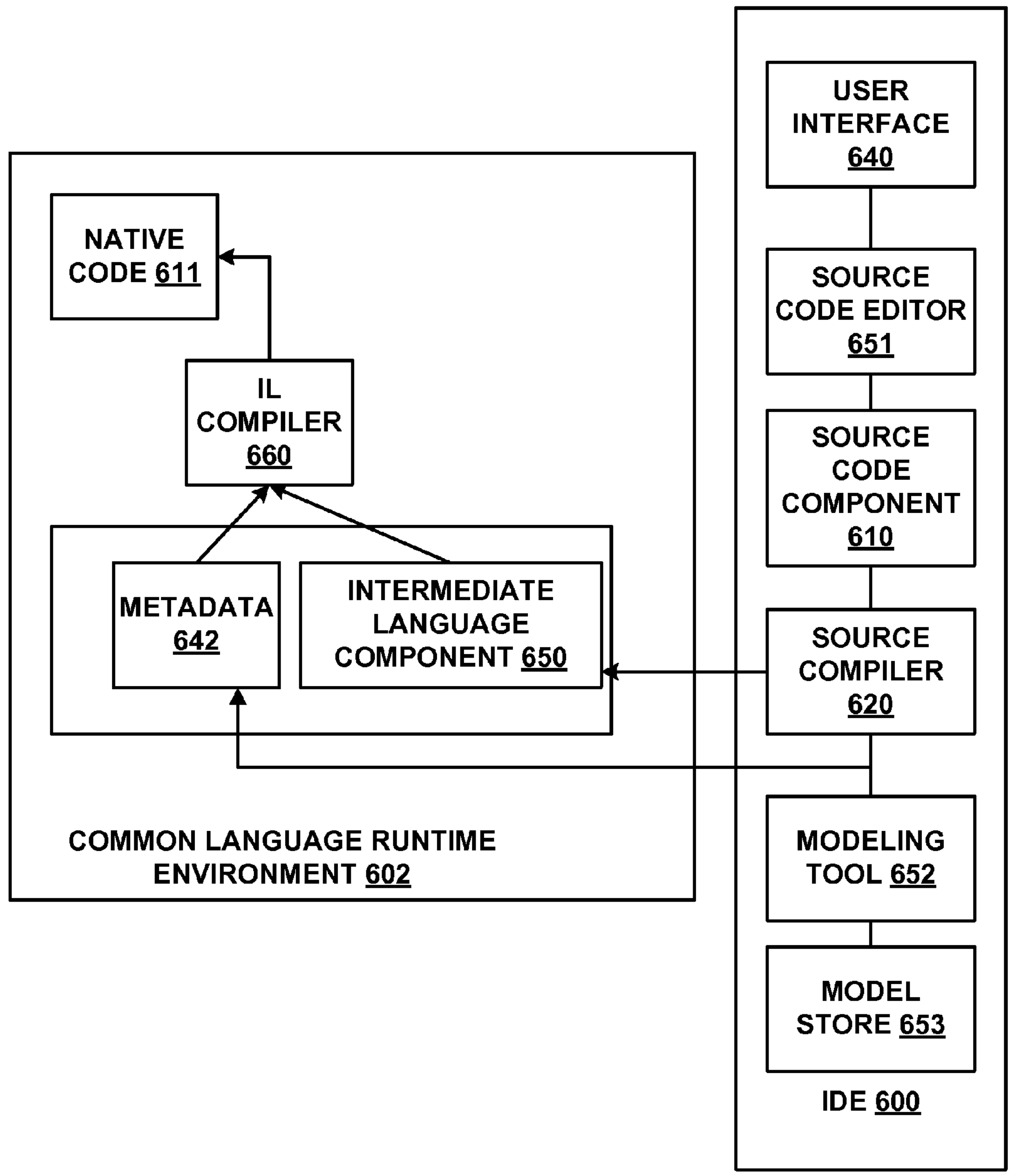
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:

at least one processor of a computing device;

a memory of the computing device; and at least one module loaded into the memory causing the at least one processor to:

manage a plurality of files comprising a working set of files for a development activity in an integrated development environment by:

detecting a user action that triggers previewing content of a file, the user action that triggers previewing content of the file is distinct from a user action that triggers fully opening the file, wherein the user action that triggers previewing content of the file is stepping into the file during debugging;

in response to detection of the user action that triggers previewing content of the file, transiently previewing content of the file in the integrated development environment, wherein the previewed file is not automatically added to the working set of files for the development activity in response to previewing the file and the previewed file is opened provisionally instead of opened fully as a durable file;

displaying content of the previewed file in a preview display stylistically distinct from a display of content of a file comprising a member of the working set of files;

and providing a mechanism to promote the previewed file to a durable file and to add the promoted previewed file to the working set of files;

wherein a history for previewed files can be viewed separately from a history of fully opened files, wherein promoting a file from preview mode to durable file merges the previewed file history to the durable file history.

2. The system of claim 1, wherein content of the previewed file is displayed in a single reusable preview display stylistically distinguishable from a display of content of a file comprising a member of the working set of files.

3. The system of claim 2, wherein an identifier of the previewed file is displayed in a preview tab stylistically distinguishable from at least one of a plurality of durable tabs, the at least one durable tab displaying an identifier of a durable file.

4. The system of claim 3, wherein the single preview tab is spatially separated from the plurality of durable tabs.

5. The system of claim 1, wherein the user action triggering the previewing content of a file comprises receiving a user action selecting a result of a search operation, receiving a "go to definition" command, or stepping into a file in a debug session.

6. The system of claim 1, wherein a chronological history of previewed files is maintained separately from a chronological history of the working set of files.

7. A method comprising:

managing a working set of files for a development activity in an integrated development environment by a processor of a computing device by:

detecting an action from a workflow process of the integrated development environment triggering previewing content of a file, the action triggering previewing content of a file is distinct from an action triggering fully opening a file, wherein the action triggering previewing content of the file is stepping into the file during debugging;

previewing content of the file, wherein previewing content of the file does not add the previewed file to a working set of files for the development activity in response to selecting the previewed file; displaying content of the previewed file in a preview display, the preview display stylistically distinguishable from a display of content of a fully opened file;

and providing a mechanism to add the previewed file to the working set;

wherein a history for previewed files can be viewed separately from a history of fully opened files, wherein promoting a file from preview mode to durable file merges the previewed file history to the durable file history.

8. The method of claim 7, wherein the previewed file is promoted to a fully opened file in response to receiving a user action editing the previewed file, a user action selecting a promote option, a user action selecting a file in a list of files in a tool window using a distinct open gesture or a user action attempting to drag a previewed file.

9. The method of claim 7, further comprising replacing content of the preview display with content of a previously viewed file in response to promoting the previewed file to a durable file.

10. The method of claim 7, wherein an identifier of a previewed file is displayed in a single reusable preview tab per well, the preview tab differing in stylistic appearance from durable tabs displaying identifiers of a plurality of durable files.

11. The method of claim 10, wherein the single reusable preview tab is spatially separated from the plurality of durable tabs.

12. The method of claim 7, wherein a chronological history of previewed files is maintained.

13. The method of claim 7, wherein content of a previewed file is displayed in a single reusable preview display, the preview display stylistically distinguishable from a display displaying content of a fully opened file.

14. A computer-readable storage memory comprising computer-executable instructions which when executed cause at least one processor of a computing device to:

monitor a workflow comprising a program development activity in an integrated development environment;

in response to detecting an action triggering previewing content of a file in the monitored workflow, previewing content of the file and displaying content of the file in a preview file display, the preview file display differing stylistically from an appearance of a display of a fully opened file, the action triggering previewing content of a file is distinct from an action triggering fully opening a file, wherein the action triggering previewing content of the file is stepping into the file during debugging;

providing a mechanism allowing promotion of the previewed file to a fully opened file, wherein promotion of the previewed file to a fully opened file adds the promoted previewed file to a working set of files associated with the program development activity;

wherein a history for previewed files can be viewed separately from a history of fully opened files, wherein promoting a file from preview mode to durable file merges the previewed file history to the durable file history.

15. The computer-readable storage memory of claim 14, comprising further computer-executable instructions, which when executed cause the at least one processor to:

reuse the preview display by removing a first previewed file and refreshing the preview display with content of a second previewed file.

16. The computer-readable storage memory of claim 14, comprising further computer-executable instructions, which when executed cause the at least one processor to:

maintain a chronological history of previewed files.

17. The computer-readable storage memory of claim 14, comprising further computer-executable instructions, which when executed cause the at least one processor to:

display an identifier of a previewed file in a single reusable preview tab, the single reusable preview tab differing in stylistic appearance from at least one non-reusable durable tab of a plurality of non-reusable durable tabs.

18. The computer-readable storage memory of claim 17, comprising further computer-executable instructions, which when executed cause at least one processor to:

refresh content of the single reusable preview tab with an identifier of a current previewed file.

19. The computer-readable storage memory of claim 14, comprising further computer-executable instructions, which when executed cause at least one processor to:

promote a previewed file to a durable file by double-clicking the previewed file in a navigation tool window.

* * * * *